US012731034B2

(12) United States Patent
Mizoguchi et al.

(10) Patent No.: US 12,731,034 B2
(45) Date of Patent: Sep. 8, 2026

(54) COMPACT REPRESENTATION AND TIME SERIES SEGMENT RETRIEVAL THROUGH DEEP LEARNING

(71) Applicant: NEC Laboratories America, Inc., Princeton, NJ (US)

(72) Inventors: Takehiko Mizoguchi, West Windsor, NJ (US); Dongjin Song, Princeton, NJ (US); Yuncong Chen, Plainsboro, NJ (US); Cristian Lumezanu, Princeton Junction, NJ (US); Haifeng Chen, West Windsor, NJ (US)

(73) Assignee: NEC Corporation (JP)

( * ) Notice: Subject to any disclaimer, the term of this patent is extended or adjusted under 35 U.S.C. 154(b) by 1423 days.

(21) Appl. No.: 17/364,125

(22) Filed: Jun. 30, 2021

(65) Prior Publication Data

US 2022/0012538 A1 Jan. 13, 2022

Related U.S. Application Data

(60) Provisional application No. 63/048,680, filed on Jul. 7, 2020.

(51) Int. Cl.
*G06N 3/084* (2023.01)
*G06F 18/21* (2023.01)
(Continued)

(52) U.S. Cl.
CPC .......... *G06N 3/084* (2013.01); *G06F 18/213* (2023.01); *G06F 18/2163* (2023.01);
(Continued)

(58) Field of Classification Search
CPC .......... G06N 3/084; G06N 3/044; G06N 3/08; G06F 18/22; G06F 18/2163; G06F 18/28; G06F 18/2415; G06F 18/213
(Continued)

(56) References Cited

U.S. PATENT DOCUMENTS 8,880,415 B1 * 11/2014 Eck .......................... G10L 25/27
704/502
10,248,663 B1 * 4/2019 Keisler .................. G06F 16/29
(Continued)

OTHER PUBLICATIONS

Bianchi et al.; "Reservoir Computing Approaches for Representation and Classification of Multivariate Time Series" (Year: 2020).*
(Continued)

*Primary Examiner* — David Yi
*Assistant Examiner* — Andrew Bracero
(74) *Attorney, Agent, or Firm* — Vincent Duffy

(57) ABSTRACT

Systems and methods for retrieving similar multivariate time series segments are provided. The systems and methods include extracting a long feature vector and a short feature vector from a time series segment, converting the long feature vector into a long binary code, and converting the short feature vector into a short binary code. The systems and methods further include obtaining a subset of long binary codes from a binary dictionary storing dictionary long codes based on the short binary codes, and calculating similarity measure for each pair of the long feature vector with each dictionary long code. The systems and methods further include identifying a predetermined number of dictionary long codes having the similarity measures indicting a closest relationship between the long binary codes and dictionary long codes, and retrieving a predetermined number of time series segments associated with the predetermined number of dictionary long codes.

20 Claims, 11 Drawing Sheets

(51) Int. Cl.
*G06F 18/213* (2023.01)
*G06F 18/22* (2023.01)
*G06F 18/2415* (2023.01)
*G06F 18/28* (2023.01)
*G06N 3/044* (2023.01)
*G06N 3/08* (2023.01)

(52) U.S. Cl.
CPC .......... *G06F 18/22* (2023.01); *G06F 18/2415* (2023.01); *G06F 18/28* (2023.01); *G06N 3/044* (2023.01); *G06N 3/08* (2013.01)

(58) Field of Classification Search
USPC ............................................................ 706/15
See application file for complete search history.

(56) References Cited

U.S. PATENT DOCUMENTS

2011/0289026 A1* 11/2011 Kannan ................... G06F 16/38 707/E17.014
2019/0034497 A1* 1/2019 Song ................... G06F 16/9014
2019/0243739 A1* 8/2019 Song ................... G06F 11/0793

OTHER PUBLICATIONS

Gordo et al., "Asymmetric distances for binary embeddings", IEEE transactions on pattern analysis and machine Intelligence, May 2013, pp. 1-15.
Gong et al., "Iterative Quantization: A Procrustean Approach to Learning Binary Codes for Large-scale Image Retrieval", IEEE transactions on pattern analysis and machine intelligence, Sep. 2012, pp. 1-15.
Liong et al., "Deep Hashing for Compact Binary Codes Learning", Proceedings of the IEEE conference on computer vision and pattern recognition, Jun. 2015, pp. 1-9.
Weiss et al., "Spectral Hashing", in Nips (vol. 1, No. 2, p. 4), Dec. 2008, pp. 1-8.
Song et al., "Deep r-th Root of Rank Supervised Joint Binary Embedding for Multivariate Time Series Retrieval", UBTECH Sydney AI Centre, SIT, FEIT, University of Sydney, pp. 1-10, Aug. 2018.
Lai et al., "Simultaneous Feature Learning and Hash Coding with Deep Neural Networks", arXiv:1504.03410v1, pp. 1-9, Apr. 2015.

* cited by examiner

COMPACT REPRESENTATION AND TIME SERIES SEGMENT RETRIEVAL THROUGH DEEP LEARNING

RELATED APPLICATION INFORMATION

This application claims priority to Provisional Patent Application No. 63/048,680, filed on Jul. 7, 2020, incorporated herein by reference in its entirety.

BACKGROUND

Technical Field

The present invention relates to retrieval of similar multivariate time series and more particularly training and implementation of neural networks for retrieval of similar multivariate time series.

Description of the Related Art

A time series is a series of observations or data points collected over a period of time that are in time order. A Multivariate time series has more than one time-dependent variable, where values of the variables are collected over a period of time. The data points can be equally spaced in time. Analysis can look for patterns, in particular periodicities in the collected data. Time series forecasting is the use of a model to predict future values based on previously observed values. Multivariate time series data naturally arises in many areas of real-world applications, for example, complex physical systems such as power plants, furnace operations, airplane and automobile engines, and air pollution monitoring. Time series data can arise from monitoring industrial processes or tracking economic and business data. Models for time series data can have many forms and represent different stochastic processes.

The series of observations or data points collected over the period of time can be identified and stored for later searching and retrieval. To be identified and stored each set of data points can be assigned a binary code as the identifier. The problem of finding optimal binary codes for the data points, however, is NP hard.

SUMMARY

According to an aspect of the present invention, a computer implemented method of retrieving similar multivariate time series segments is provided. The method includes extracting a long feature vector and a short feature vector from a time series segment, converting the long feature vector into a long binary code, and converting the short feature vector into a short binary code. The method further includes obtaining a subset of long binary codes from a binary dictionary storing dictionary long codes based on the short binary codes, and calculating similarity measure for each pair of the long feature vector with each dictionary long code. The method further includes identifying a predetermined number of dictionary long codes having the similarity measures indicting a closest relationship between the long binary codes and dictionary long codes, and retrieving a predetermined number of time series segments associated with the predetermined number of dictionary long codes.

According to another aspect of the present invention, a processing system for retrieving similar multivariate time series segments is provided. The system includes one or more processors, and memory coupled to the one or more processors. The system further includes a long feature extractor stored in memory, wherein the long feature extractor is configured to extract a long feature vector from a time series segment, and a short feature extractor stored in memory, wherein the short feature extractor is configured to convert a long feature generated by the long feature extractor into a shorter length feature through a linear mapping. The system further includes a long binary extractor stored in memory, wherein the long binary extractor is configured to convert a long feature from the long feature extractor into a long binary code having the same length as the long feature, and a short binary extractor stored in memory, wherein the short binary extractor is configured to convert a short feature from the short feature extractor into a short binary code having the same length as the short feature. The system further includes a similarity comparator stored in memory, wherein the similarity comparator is configured to calculate a pairwise similarity between a long binary code extracted from the query and all long binary codes retrieved from a dictionary, and identifying a predetermined number of dictionary long codes having the similarity measures indicting a closest relationship between the long binary codes and dictionary long codes.

According to yet another aspect of the present invention, a computer program product for retrieving similar multivariate time series segments, the computer program product comprising a non-transitory computer readable storage medium having program instructions embodied therewith, the program instructions executable by a computer. The program instructions executable by a computer to cause the computer to perform extracting a long feature vector and a short feature vector from a time series segment, converting the long feature vector into a long binary code, and converting the short feature vector into a short binary code. The program instructions executable by a computer further cause the computer to perform obtaining a subset of long binary codes from a binary dictionary storing dictionary long codes based on the short binary codes, and calculating similarity measure for each pair of the long feature vector with each dictionary long code. The program instructions executable by a computer further cause the computer to perform identifying a predetermined number of dictionary long codes having the similarity measures indicting a closest relationship between the long binary codes and dictionary long codes, and retrieving a predetermined number of time series segments associated with the predetermined number of dictionary long codes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
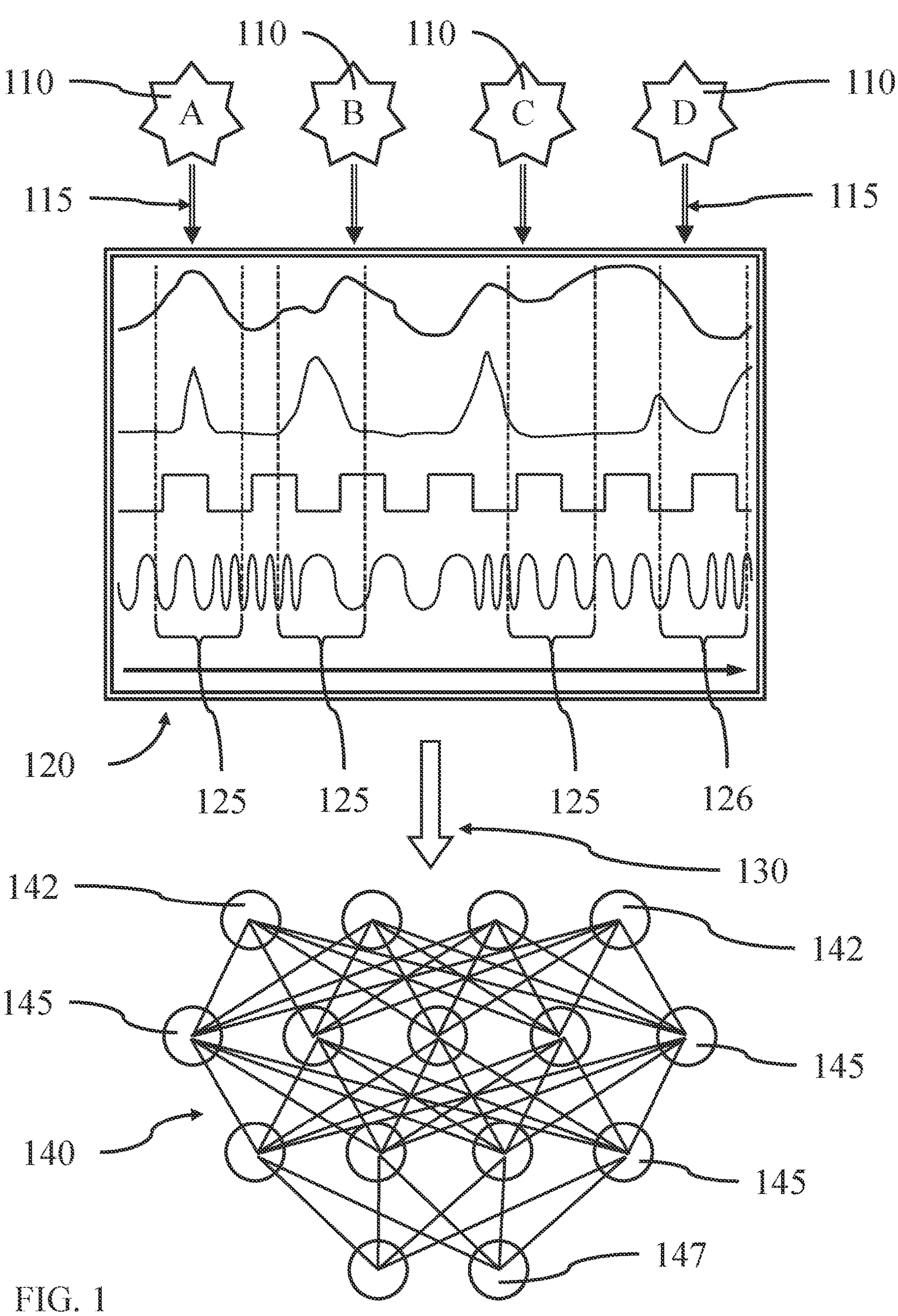
FIG. 1 is a block/flow diagram illustrating a high-level system/method for collection of multivariate time series data from a plurality of sensors for subsequent generation of hash codes by a neural network, in accordance with an embodiment of the present invention.

In accordance with embodiments of the present invention, systems and methods are provided for obtaining compact representations of historical time series data for efficient retrieval of the most relevant data from large amounts of historical data through the use of deep learning neural networks. The task of multivariate time series retrieval can be applied to many tasks in complex systems including system status identification, fault detection and fault prediction. Sensors can also be placed on people for continuously monitoring health status. Large amounts of historical multivariate time series data recorded from a system can be used to understand the current state of the system through comparison to similar failure occurrences. Retrieving relevant multivariate time series segments (i.e., a slice of multivariate time series that lasts for a short time period) from a database by querying with a current time series segment is referred to as multivariate time series retrieval.

The amount of memory used to identify the stored objects, however, should be small enough so that all object codes can fit in RAM. If this is not the case, i.e. if a significant portion of the object codes have to be stored on a disk, then the response time of a query collapses because the disk access is much slower than that of RAM access. A simpler representation of the time series segments can be obtained to reduce memory usage. Similar samples in raw input space can be mapped to nearby binary codes by minimizing triplet loss, but the boundaries captured by a triplet loss depends on the triplet sample selection. Cross-entropy loss can be used for capturing a global decision boundary.

In semantic hashing, each item in a database can be represented by a compact binary code. The code is constructed so that similar items will have similar binary codes and a simple feedforward network can calculate the binary code for a new object input.

In one or more embodiments, a deep neural network can be trained to provide compact binary code representations for input data. Multivariate time series retrieval can then find the most relevant multivariate time series segments from a huge amount of historical data by querying with current observations based on the binary representations. For example, when a power plant shows some faulty activity, a plant operator may want to refer to similar historical fault cases to identify the specific abnormal status. Therefore, retrieving relevant multivariate time series segments (i.e., a slice of multivariate time series data over a short time period) from a database by querying with the current time series data segment for the present faulty state. Binary codes can preserve in a compact representation the relative similarity relations of the time series historical data in a raw input space. Learning based hashing aims to learn a compact and similarity preserving bit-wise representation such that similar samples in a raw input space are mapped to nearby binary codes by minimizing a triplet loss. Learning based (data dependent) hashing methods build hash function by leveraging the historical training samples.

In various embodiments, an end-to-end architecture can be provided for efficient multivariate time series retrieval considering a global decision boundary. Only considering relative similarity relation may not capture the global picture of a decision boundary and an expensive step to retrieve multivariate time series data may be needed even with compact binary representation. Even with compact binary representation, an expensive procedure including sorting and a similarity search over all historical data may be needed to retrieve the most relevant time series.

In various embodiments, Deep Sub-Linear Hashing Network (DSLHN) can be used to perform multivariate time series retrieval and classification. DSLHN employs the Long Short-Term Memory (LSTM) units to extract simple low dimensional features from the input time series segments capturing their temporal dynamics. Two hash functions can predict two different length binary codes, full length binary codes and shorter sub-linear binary codes, from a feature by two serial fully-connected layers. DSLHN can generate two different length binary codes, full length binary codes and shorter sub-linear ones, from a single time series segment.

In various embodiments, a classifier is employed to fully utilize the label information in supervised learning-based hashing. A compact binary representation from input data can be data dependent hashing or learning based hashing. Two binary codes of different length can be extracted for each input multivariate time series segment so that efficient similarity searches can be performed.

In one or more embodiments, deep neural networks including a long feature extractor and a short feature extractor can be utilized to extract segments from entire multivariate time series, and employ recurrent neural network (RNN) such as LSTM/GRU to extract a feature from each segment. A long binary extractor can convert a long feature to a same length binary code by checking the signs of all entries in the feature vector. An extracted long binary code can be stored in a database. The short feature extractor can convert a long feature to a shorter length feature by a linear mapping, and a short binary extractor can convert the short feature to a same length binary code by checking the signs of all entries in the short feature vector. Extracted short binary codes can also be stored in a database. A classifier can compute the probability of belonging to each label and calculates the loss from the misclassification based on the given labels. A sliding window can be used to extract segments from entire multivariate time series, where the length of the sliding window is less than the total length of the time series.

It is to be understood that aspects of the present invention will be described in terms of a given illustrative architecture; however, other architectures, structures, components and process features and steps can be varied within the scope of aspects of the present invention.

Referring now in detail to the figures in which like numerals represent the same or similar elements and initially to FIG. 1, a high-level system/method of a block/flow diagram for collection of multivariate time series data from a plurality of sensors for subsequent generation of hash codes by a neural network is illustratively depicted in accordance with an embodiment of the present invention.

In one or more embodiments, a plurality of sensors 110 can collect sensor readings on a corresponding system being monitored, and output 115 multivariate time series data 120 of the senor readings, where each different sensor A, B, C, D, can produce a different type of time series data. The sensors 110 can be sensors, for example, physical sensors, for measuring, for example, temperature, humidity, vibration, pressure, voltage, current, magnetic field, electrical field, and light sensors, and software sensors, such as logging utilities installed on a computer system to record information regarding the state and behavior of the operating system and applications running on the computer system. The collected multivariate time series data 120 can be composed of a plurality of time series segments 125, 126 that capture particular features of the system behavior from the sensors 110, where the system behavior can be analyzed to discover and/or predict the operation of the system being monitored. The multivariate time series data 120 can be fed 130 into a neural network 140 for analysis and storage, where the neural network 140 can be a deep learning neural network.

In various embodiments, the neural network 140 can be a recurrent neural network (RNN), for example, a long short term memory (LSTM) or gated recurrent unit (GRU). The neural network can include one or more input nodes 142, hidden nodes 145, and output nodes 147.

In one or more embodiments, the neural network 140 can include a plurality of neural networks that are trained to produce binary codes from long and short features of the multivariate time series data 120. The neural network 140 can be a deep neural network having one or more hidden layers that include weights for producing the binary codes, where the hidden nodes 145 form the one or more hidden layers, and the hidden layers can be fully connected.

In various embodiments, a later time series data segment 126 can be the basis for identifying similar earlier time series data segment(s) 125. Time series retrieval tasks aim to identify and retrieve relevant time series from a historical database based on the pair-wise similarity measure between a later query time series segment 126 and the historical time series segments 125.

In various embodiments, a proposed model employs Long Short-Term Memory (LSTM) units to extract simple low dimensional features from the input time series segments capturing their temporal dynamics. Two different hash functions can predict two different length binary codes from a feature by two serial fully-connected layers. The model can be trained in an end-to-end manner, so that two triplet losses for the two binary codes simultaneously preserve relative similarity measure relations as well as the cross-entropy loss to fully utilize label information for capturing a global decision boundary. Both real value features and their corresponding hash codes can be jointly learned in an end-to-end manner in the neural networks.

Figure 2:
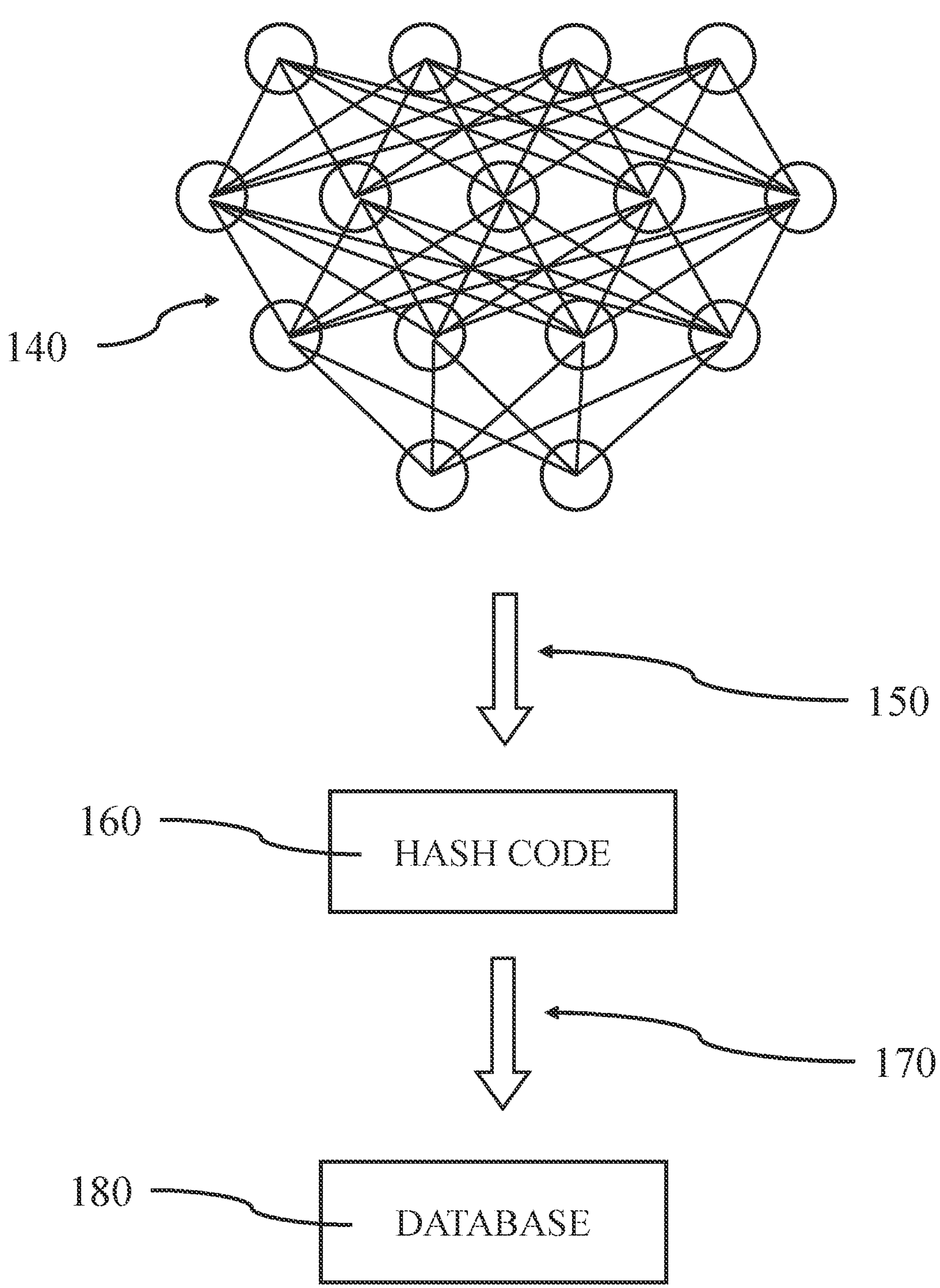
FIG. 2 is a block/flow diagram illustrating a system/method of a neural network producing and storing a hash code, in accordance with an embodiment of the present invention.

FIG. 2 is a block/flow diagram illustrating a system/method of a neural network producing and storing a hash code, in accordance with an embodiment of the present invention.

In various embodiments, the neural network 140 can be trained to generate and output 150 a separate hash code 160 for each segment 125, 126 of the multivariate time series data 120, where the neural network 140 can be trained to generate a short hash code to provide a smaller search space with an increased searching efficiency, and/or a long hash code that is the same length as a long feature. The long hash code and short hash code can be stored 170 in a database 180 for subsequent searching and retrieval.

In various embodiments, two different length binary codes (hash codes) 160 enable sub-linear searching, which involves searching only a subset of the historical time series data, as specified by the sub-linear binary codes. The binary codes can also map images that are similar (either in terms of feature space distance or semantic distance) to binary strings with a low Hamming distance.

In various embodiments, a deep neural network can learn the parameters of the network by using three criterions for the codes obtained at the top layer of the network: 1) minimizing loss between the original real-valued feature and the learned binary vector; 2) binary codes distribute evenly on each bit, and 3) each bit is as independent as possible. The parameters of the neural networks can be updated by back-propagation based on the optimization objective function at the top layer.

In various embodiments, two triplet losses can be employed for these two binary codes to simultaneously preserve relative similarity measure relations. A cross-entropy loss can be used to fully utilize label information for capturing the global decision boundary in the latent space. The Deep Sub-Linear Hashing Network (DSLHN) can be trained in end-to-end manner by minimizing the sum of the two triplet losses and the cross-entropy loss with backpropagation over an entire network based on stochastic gradient descent. A sub-linear search that requires searching only a subset of historical data specified by sub-linear binary codes can then be performed for a query.

Figure 3:
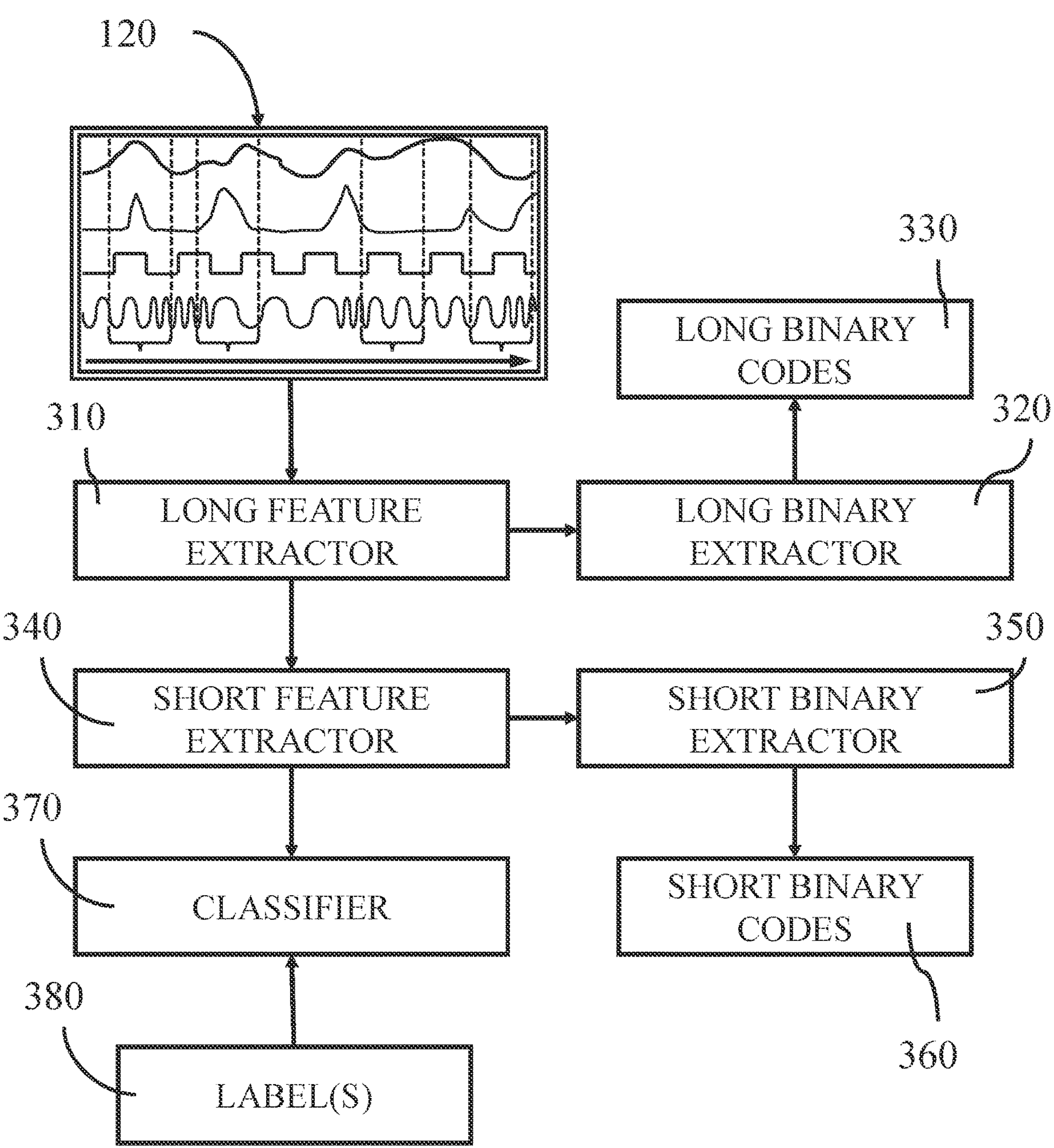
FIG. 3 is a flow diagram illustrating a system/method for long and short binary code generation using long and short feature extractors, in accordance with an embodiment of the present invention.

FIG. 3 is a block/flow diagram illustrating a system/method for long and short binary code generation using long and short feature extractors, in accordance with an embodiment of the present invention.

In various embodiments, a multivariate time series 120 including multiple time series segments can be fed into a long feature extractor 310 that can utilize a sliding window to extract the segments 125 from the entire multivariate time series 120. A recurrent neural network (RNN), for example, an LSTM or GRU, can be used to extract a long feature from each segment 125, 126, where each segment can be a slice of the multivariate time series that lasts for a predefine number of time steps (e.g., a duration or time period). The time series segment 126 can be the most recent time series segment from the time series 120.

In various embodiments, a long binary extractor 320 can receive and convert a long feature from the long feature extractor 310 into a long binary code 330 having the same length as the long feature. The long binary code 330 can be stored in a database.

In various embodiments, a short feature extractor 340, which can be a recurrent neural network (RNN), for example, an LSTM or GRU, can be used to convert a long feature generated by the long feature extractor 310 into a shorter length feature through a linear mapping.

In various embodiments, a short binary extractor 350 can receive and convert a short feature from the short feature extractor 340 into a short binary code 360 having the same length as the short feature by checking the sign of the entries in a short feature vector. The short binary code 360 can be stored in a database. In various embodiments, the short binary code 360 is much shorter than the long binary code 330, where, for example, a long code can be 256 bits long and the short code can be 32 bits long. A short code can be, for example, ⅛$^{th}$ the length of the long code, or the short code can be about ¼$^{th}$ to about 1/16$^{th}$ the length of the long code, or the short code can be about ⅙$^{th}$ to about 1/12$^{th}$ the length of the long code, although other length relationships are also contemplated.

In various embodiments, a classifier 370 can receive a short feature and compute the probability of the short feature belonging to a class, where each class is identified as a label 380, and calculate a loss from misclassification by the classifier based on the provided label(s) 380. The losses can be used to update the parameters of the long feature extractor 310 and/or short feature extractor 340. The losses can be triplet losses for both the long and short binary codes, as well as cross-entropy losses for short features. The parameters can be updated based on triplet minimization. In various embodiments, a classifier 370 is multi-class classifier including different classes from the ground truth provided by label(s) 380, that can compute the probability of the short feature belonging to each class identified by the labels. For example, if there are three classes c1, c2 and c3, classifier 370 calculates a probability of a short feature "f" belonging to each class, i.e., it calculates p(c1|f), p(c2|f) and p(c3|f).

In various embodiments, after training is finished, the hashing process can be conducted using a new time series segment. A long binary dictionary can be constructed that stores the set of long binary codes that have the same bit pattern as a short binary code.

In various embodiments, a labeled multivariate time series segment (X, y), where y denotes the label, is denoted as a tuple of d-dimensional and w-length segment $X=[x^1, x^2, \ldots, x^d]^T=[x_1, x_2, \ldots, x_w]\in \mathbb{R}^{d\times w}$ and the label $y\in C$, where w is the length of the window, $$x^k = [x^k1, x^k2, \ldots, x^k_w] \in \mathbb{R}^w (k = 1, 2, \ldots, d)$$

is a time series segment of length w, $$x_t = [x_t^1, x_t^1, \ldots, x_t^d] \in \mathbb{R}^w (t = 1, 2, \ldots, w)$$

is a vector of from all dimensions of the time series segment at a certain time point t, and C is the set of all class labels.

Suppose there is a collection of historical time series segments denoted by $$\mathcal{D} = \{X_i\}_{i=1}^N,$$

where N is the total number of segments in the collection. Given a newly incoming multivariate time series segment query $X_q \notin \mathcal{D}$, i.e., a slice of d-dimensional time series which lasts w time steps that was not previously a component of the set (e.g., time series segment 126), the time series retrieval task is to find the time series segments in $\mathcal{D}$ most similar to the new time series segment 126, i.e., that is to obtain:

$$X_q^* \in \operatorname{argmin} \mathcal{S}(X_q, X_p), X_p \in \mathcal{D};$$

where p is the index of p$^{th}$ segment ($p\in\{1, 2, \ldots, N\}$) for N segments, and $\mathcal{S} : \mathbb{R}^{d\times w}\times\mathbb{R}^{d\times w}\rightarrow[0, \infty)$ is a function which measures the similarity between two multivariate time series segments. This can be utilized for calculating the similarity measure for each pair of the long feature vectors with each of a dictionary long code(s).

Feature Extraction Layer 410: To perform multivariate time series retrieval efficiently, a good, simple representation of raw multivariate time series segments capturing their temporal dynamics are obtained. In the feature extraction layer 410, given a multivariate time series segment $X=[x_1, x_2, \ldots, x_d]\in \mathbb{R}^{d\times w}$, where $x_t\in \mathbb{R}^d (1\leq t\leq d)$, we learn a non-linear feature extraction function $f: \mathbb{R}^{d\times w}\rightarrow\mathbb{R}^m$ from X to a simple m-dimensional ($m<<d\times w$) representation (feature) h, where $h\in \mathbb{R}^m$ with $h:=F(X)$. In various embodiments, for example, m=256, and $d\times w>20{,}000$, where $d\times w$ can be in a range of about 50 times (50×) to about 100 times (100×), or about 75 times (50×) to about 80 times the value of m.

In various embodiments, to extract features from multivariate time series segments, a LSTM can be utilized as F, since an LSTM is simple, explicitly captures both the temporal dynamics and the long-term dependencies of the inputs, and can be used for sequence to sequence learning. Each LSTM unit is composed of a memory cell with the state $s_t$ and three sigmoid gates: the forget gate $f_t$, input gate $i_t$ and output gate $o_t$ ($s_t, f_t, i_t, o_t\in \mathbb{R}^m$), which control the access to the memory cell. The update of an LSTM unit can be summarized as:

$$f_t := \sigma(W_f[h_{t-1}; x_t] + b_f),$$
$$i_t := \sigma(W_i[h_{t-1}; x_t] + b_i),$$
$$o_t := \sigma(W_o[h_{t-1}; x_t] + b_o),$$
$$s_t := f_t \odot s_{t-1} + i_t \odot \tanh(W_s[h_{t-1}; x_t] + b_s),$$
$$h_t := o_t \odot \tanh(s_t),$$

where $[h_{t-1};x_t]\in \mathbb{R}^{m+d}$ is the vertical concatenation of the previous hidden state $h_{t-1}$ and the current input $x_t$, $\sigma:\mathbb{R}^m\rightarrow\mathbb{R}^m$ is an element-wise logistic sigmoid function and $\odot$ is an element-wise multiplication operator (i.e., Hadamard product).

Weights $W_f$; $W_i$; $W_o$; $W_s\in \mathbb{R}^{m\times(m+d)}$ and biases $b_f$, $b_i$, $b_o$, $b_s\in \mathbb{R}^{m\times(m+d)}$ are the parameters to be learned, where the weights can be in the form of matrices. In the feature extractor, the last hidden state of LSTM units $h_w$ is employed as the feature (simple representation) of a raw multivariate time series segment because it encodes temporal dynamic information from the entire segment.

Figure 4:
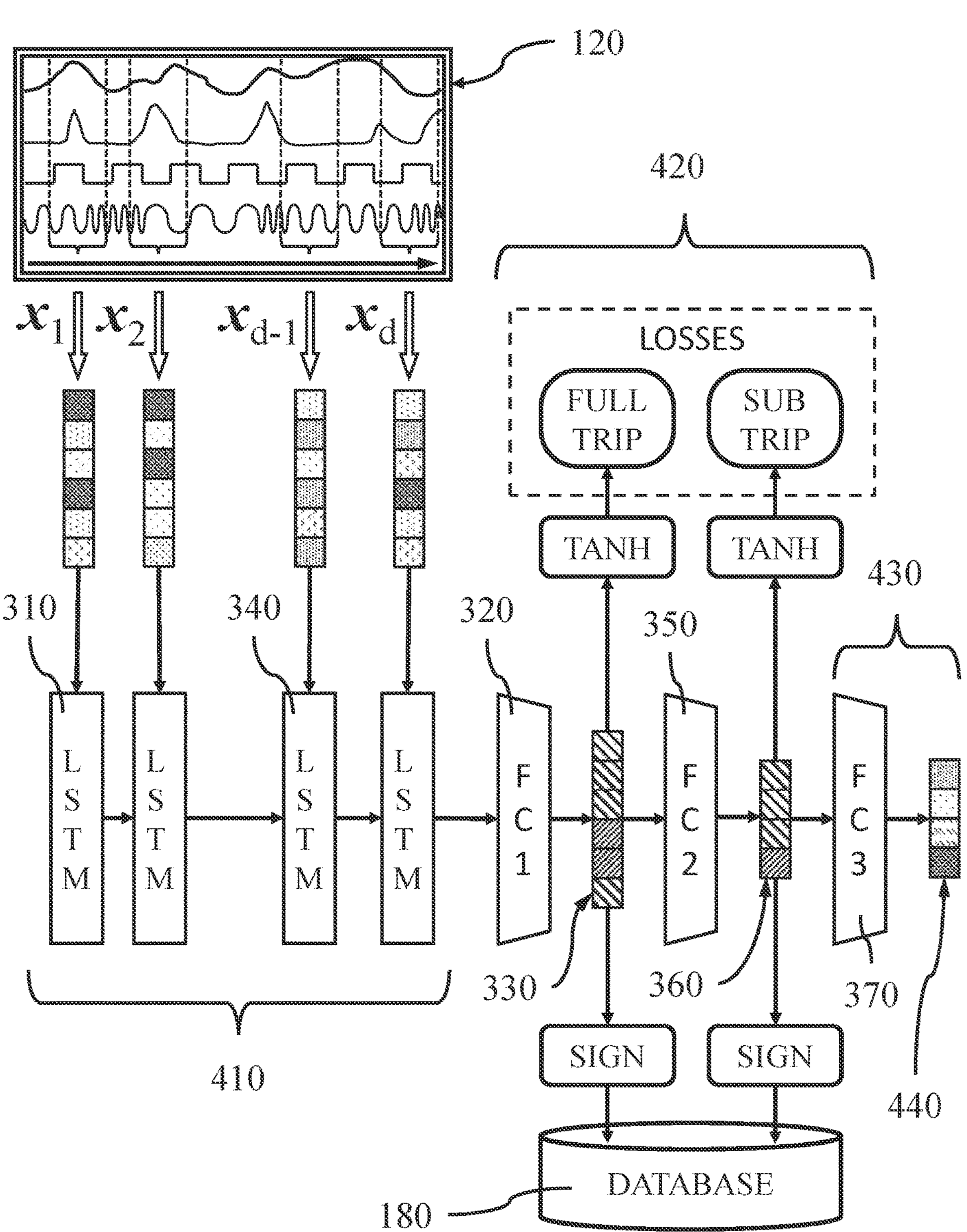
FIG. 4 is a block/flow diagram illustrating an architecture for a system/method of a Deep Sub-Linear Hashing Network (DSLHN), in accordance with an embodiment of the present invention.

FIG. 4 is a block/flow diagram illustrating an architecture for a system/method of a Deep Sub-Linear Hashing Network (DSLHN), in accordance with an embodiment of the present invention.

Feature-Binary Layer 420: Even with a simple representation of a multivariate time series, to retrieve historical time series using a query is a time consuming process involving calculating the similarity of all pairs between the query and the historical data, and sorting the pairs based on their similarity. To avoid this process, a sub-linear search strategy can be employed, which utilizes much simpler binary representation for efficient multivariate time series retrieval.

In various embodiments, in a feature-binary layer 420, two kinds of binary codes 330, 360 with different lengths, $v_1$-bit full-length binary codes and $v_2$-bit sub-linear binary codes, with the length of $v_1$ greater than $v_2$, ($v_1>v_2$), can be extracted from the output of the feature extraction layer 410, which can include the long feature extractor 310 and the short feature extractor 340, which can be implemented as recurrent neural networks (RNNs).

Binary code prediction functions: Given the representation for a raw multivariate time series segment $h_w$, we aim to learn two mappings $H_1:\mathbb{R}^m\rightarrow\{-1, +1\}^{v1}$ and $H_2:\mathbb{R}^m\rightarrow\{-1, +1\}^{v1}$, which each compress an m-dimensional real-valued input h into respectively v1-bit and v2-bit binary codes. These mappings are referred to as whole binary embedding or hash functions in the literature and are expressed as:

$$H_i(h)=\mathrm{sgn}(G_i(h)),\ i=1,2,$$

where sgn(·) is the element-wise sign function that extracts the sign of each element in the input, and $G_i:\mathbb{R}^m\rightarrow\mathbb{R}^{vi}$ (i=1, 2) is a prediction function represented by FC1 and FC2. $H_1$ and $H_2$ are each hash functions. A variety of prediction function are available for serving to specific data domains and practical applications. In various embodiments, linear prediction functions for $G_1$ and $G_2$, i.e.:

$$G1(h) := W_1 h + b_1,$$

$$G2(h) := W_1 G1(h) + b_2,$$

where $Wi\in\mathbb{R}^{vi\times m)}$ (i=1, 2) is a weight matrix to be learned. To make each bit nearly balanced and thus take as much information as possible, the bias terms $b_1=-W_1\bar{h}$, and $b_2=-W_2\bar{g}$, respectively with the means of h and $G_1$(h) over all samples, $$\bar{h}=\sum_{i=1}^{N}F(X_i),\text{ and}$$

$$\bar{g}=\sum_{i=1}^{N}G_1(F(X_i)).$$

The whole hash functions $H_1$ and $H_2$ can be:

$$H_1(h; W_1) := \mathrm{sgn}\big(W_1\big(h-\bar{h}\big)\big),$$

$$H_2(h; W_2) := \mathrm{sgn}(W_2(G_1(h)-\bar{g})),$$

which are parameterized respectively by $W_1$ and $W_2$. In the following description, we simply use $H_1$(h) and $H_2$(h) for denoting $H_1$(h; $W_1$) and $H_2$(h; $W_2$), respectively.

Triplet losses: Desired hash functions should keep relative similarity relationships in output (Hamming) space between two binary codes from that between two multivariate time series in input space. Rather than considering only pair-wise similarities, relative similarities in the form of triplets (a, p, n)$\in T_{triplet}$, can be leveraged, whose indices pair (a, p) specifies more similar input segment pair ($X_a$, $X_p$) than the segment pair ($X_a$, $X_n$) assigned by (a, n), where "a" refers to anchor, "n" refers to negative, and "p" refers to positive. The triplet loss (e.g., anchor, positive, negative) can be employed to ensure that a Hamming distance between an anchor and a positive is less than a Hamming distance between the anchor and a negative. $T_{triplet}$, is the set { } of all possible triplet indices. The triplets are selected based on class labels, e.g., (a, p, n), which are selected so that Xa and Xp belong to the same class, while $X_a$ and $X_n$ belong to different classes. Intuitively, the desired hash functions $H_i(\cdot)$ (i=1; 2) would be expected to preserve these relative similarity relationships revealed by $L_{triplet}$, within the Hamming space, i.e., to make the Hamming distance between the embeddings $H_i(h_a)$ and $H_i(h_p)$ smaller than that between $H_i(h_a)$ and $H_i(h_n)$, where $h_a$, $h_p$ and $h_n$ are respectively anchor, positive, and negative features extracted from $X_a$, $X_p$ and $X_n$ by F (·).

The triplet losses that evaluate hash functions $H_i$ (i=1; 2) under the above intuition are then:

$$\ell_i^{triplet} := \sum_{(a,p,n)\in\mathcal{L}_{triplet}}\max(0,\ d_i^p-d_i^n+\alpha),\ (i=1, 2),\text{ where}$$

$$d_i^q := \|H_i(h_a)-H_i(h_q)\|_0$$

is the Hamming distance between $H_i(h_a)$ and $H_i(h_q)$ (q$\in${p, n}), $\|h\|_0$ is the $\ell_0$-norm, which counts the number of non-zero entries in h, and α≥0 is a margin.

That equation just defines $$d_i^p\text{ and }d_i^n,$$

q can be either p or n. $h_q$ is either $h_p$ or $h_n$ discussed above.

Classification Layer 430: The triplet losses are sufficiently powerful if features or binary codes have rich information that can capture the dynamics of inputted multivariate time series. However, triplet losses are still based on a relative distance relationship, and thus does not consider the global picture of a decision boundary in the feature space. This may have a large influence if the decision boundaries in the Hamming space are obscure, since short binaries like sub-linear binary codes by $H_2(\cdot)$ have poor information to fully represent input time series segments. Therefore, information from class labels can be fully utilized to differentiate feature representation around the boundaries if they are available.

The classification layer 430 can contain a fully connected (FC) network 370, FC3, that computes the logits 440, $z=W_c u$, where $W_c\in\mathbb{R}^{|C|\times v2}$ is the weight matrix to be learned. $u:=G_2(h)$ for the sub-linear feature extracted by $G_2(\ )$. FC1 and FC2 can compresses (reshape) the intermediate features to desired dimensional features, for example, FC1 reshapes the LSTM output to v1 dimensional features by $G1(h):=W_1h+b_1$.

In various embodiments, a softmax layer is added to compute the predicted probability by $$\hat{y} := \exp(z)/\sum_{j=1}^{|C|}\exp(z_j)\in[0, 1]^{|C|},$$

where $z_j$ is the j-th entry in z.

Cross-Entropy Loss: To provide differentiated feature representations between different classes, following the standard classification strategy, a cross-entropy loss can be utilized for penalizing misclassifications in the sub-linear feature space.

$$\ell^{ce} := \sum_{i=1}^{N} \mathbb{1}_{yi}^{T}\log(\hat{y}_i) + (\mathbb{1} - \mathbb{1}_{yi})^{T}\log(\mathbb{1} - \hat{y}_i),$$

where $\mathbb{1}_{yi} \in \{0, 1\}^{|C|}$ is the one-hot representation of yi and $\hat{y}_i$ is the predicted probability both for the input time series segment $X_i \in D$, and II is the |C|-length vector of all ones.

All loss functions can be summarized as the following:

$$\ell(\theta) := \sum_{i=1}^{2} \ell_i^{triplet}(\theta) + \lambda_{ce}\ell^{ce}(\theta),$$

where θ is the set of all trainable parameters in the model, i.e., $\theta := \{W_f, W_i, W_o, W_s, b_f, b_i, b_o, b_s, W_1, W_2, W_c\}$, and $\lambda_{ce} \geq 0$ is the weight parameter that controls the importance of the cross-entropy loss, $\ell^{ce}$.

Unfortunately, the objective is hard to optimize because the hash functions $H_i(\cdot)$ (i=1; 2) are discrete mappings and the Hamming distances in the triplet losses $$\ell_i^{triplet}(i = 1; 2)$$

lie in discrete spaces. Therefore, the network architecture is discrete in nature and its associated optimization problem is combinatorially difficult. To address this issues, the original discrete objective can be relaxed to a continuous and differentiable one. The hash functions $H_1(\cdot)$ and $H_2(\cdot)$ can be relaxed as:

$$H_1(h) \approx \overline{H}_1(h) := \tanh\left(W_1\left(h - \overline{h}\right)\right),$$

$$H_2(h) \approx \overline{H}_2(h) := \tanh(W_2(G_1(h) - \overline{g})),$$

which are differentiable. This relaxation is based on the standard approximation sgn(·)≈tan h(·). The Hamming distance can also be relaxed to the $\ell_1$-distance, i.e., $$d_i^q \approx \overline{d}_i^q := \left\|\overline{H}_i(h_a) - \overline{H}_i(h_q)\right\|_1 (q \in \{n, p\}, i = 1; 2).$$

$\overline{H}_i$ is either $\overline{H}_1$ or $\overline{H}_2$.

Based on the above relaxations, we finally have the following continuous and differentiable objective:

$$\overline{\ell}(\theta) := \sum_{i=1}^{2} \overline{\ell}_i^{triplet}(\theta) + \lambda_{ce}\ell^{ce}(\theta),$$

where $$\overline{\ell}_i^{triplet} := \sum_{(a,p,n) \in T_{triplet}} \max\left(0, \overline{d}_i^p - \overline{d}_i^n + \alpha\right), (i = 1, 2).$$

These relaxations have been naturally used for the optimization of binary embedding networks. An Adam optimizer can be employed to perform backpropagation over the entire network based on stochastic gradient descent (SGD) with a mini-batch size of 256 for optimizing the trainable parameters θ of the proposed network.

Multivariate Time Series Retrieval Based on Sub-Linear Search:

If the training is finished, two different length of binary codes, $$c_i^{full} \in \{0, 1\}^{v1} \text{ and } c_i^{sub} \in \{0, 1\}^{v2}$$

can be extracted for the historical time series segments $X_i \in D$ respectively by $$c_i^{full} := H_1(F(X_i)) \text{ and } c_i^{sub} := H_2(F(X_i)).$$

Since $v_2 < v_1$, the number of unique sub-linear binary codes, $$c_i^{sub},$$

extracted from $X_i$ (i=1, . . . , N) are expected to be much less than that of unique full-length binary codes, $$c_i^{full},$$

i.e., many different full-length binary codes are expected to share the same sublinear binary code. This fact enables us to perform efficient multivariate time series retrieval by a sub-linear search.

The sub-linear search algorithm for efficient multivariate time series retrieval is summarized in Algorithm 1:

Input: $X_q$, L, k, $r_{max}$

Output: Top-k similar time series segments to $X_q$

1) $\mathcal{J} \leftarrow \emptyset, r \leftarrow \emptyset;$
2) $c_q^{full} \leftarrow H_1(F(X_q)), c_q^{sub} \leftarrow H_2(F(X_q));$
3) while $|\mathcal{J}| < k$ and $r < r_{max}$ do
4) $\Omega_r \leftarrow \left\{c \in \{0, 1\}^{v2} \,\middle|\, \left\|c - c_q^{sub}\right\|_0 = r\right\};$
5) for $c' \in \Omega_r$ do
6) $\lfloor \mathcal{J} \leftarrow \mathcal{J} \cup \mathcal{L}(c');$
7) $r \leftarrow r + 1;$
8) $\Delta \leftarrow \left\{\left\|c_q^{full} - c_q^{sub}\right\|_0 \,\middle|\, j \in \mathcal{J}\right\};$
9) $[i_1^*, i_{21}^*, \ldots , i_{k1}^*] \leftarrow \text{argsort}(\Delta)[:k];$
10) return $X_{i_1^*}, \ldots , X_{i_k^*}.$ After extracting full-length and sub-linear binary codes for all historical time series segments, we construct a dictionary L which returns the set of all indices that have the same sub-linear binary code, i.e., Note that the items in L are disjoint, $$\mathcal{L}(c^{sub}) := \{i \mid c_i^{sub} = c^{sub}\} \subset \{1, \ldots, N\}.$$

Note that the items in L are disjoint, i.e., $\mathcal{L}(c_i) \cap \mathcal{L}(c_i) = \emptyset$ if $c_i \neq c_j$.

For a query time series segment $X_q$, the full-length and sub-linear binary codes, $$c_q^{full} \text{ and } c_q^{sub},$$

are extracted by DSLHN (line 2). Then, we first retrieve indices of time series segment in database by $$\mathcal{L}(c_q^{sub})$$

and add them to the candidate indices J (lines 4-6 for r=0). If we do not retrieve sufficient number of indices at this time, i.e., $|\mathcal{J}|<k$, we next look for L with the second nearest sub-linear binary codes, i.e., $\Omega_r$, sub-linear binary codes, r(≥1) of whose bit(s) is (are) different from $$c_q^{sub}.$$

We iterate this process incrementing r until we have enough candidates (i.e., $|\mathcal{J}| \geq k$) up to the pre-defined maximum number of flipped bits $r_{max}$ (lines 3-7).

Once we have enough numbers of candidate indices, we calculate pair-wise Hamming distances Δ between full-length binary code of the query segment $$c_q^{full}$$

and those of the subset of database segments assigned by J (line 8). Then, we sort Δ in ascending order and retrieve up to k number of indices from the top ones (line 9), for example, we retrieve j' as $i_1$* if $$\|c_q^{full} - c_q^{sub}\|_0$$

is the smallest within Δ. Finally, we retrieve time series segments $Xi_1$; : : : ; $Xi_k$.

Complexity: Here, we discuss the time complexity of the sub-linear search algorithm. This algorithm mainly separated into dictionary access (lines 4-6) and re-ranking (line 9). For general $r_{max}$, the number of dictionary accesses could be exponential w.r.t. $r_{max}$, i.e., $$\mathcal{O}\left(\binom{v_2}{r}\right) = \mathcal{O}v_2^r$$

in the worse case scenario, so we fix $r_{max}$ to at most 2 in practice to avoid combinatorial explosion. For the re-ranking part, it has $|\mathcal{J}|\mathcal{J}(|\mathcal{J}|\log|\mathcal{J}|)$ time complexity. The number of candidate $|\mathcal{J}|$ depends on the properties of the set of historical time series segments. It would be k in the best case while N is the worst case scenario, but no more than the full linear search complexity O(N log N).

The hyper-parameter $\lambda_{ce}$ of DSLHN is optimized based on grid search over $\lambda_{ce}$ 2 f0:001; 0:01; 0:1; 1:0 g.

Most of the variation in x can be accounted for by m principal components (PCs), where m«p (the total number of variable components). A reduction in complexity and corresponding reduction in data size is achieved by transforming the original variables to the principal components and the corresponding reduction in the number of variables storing the information. Transforming high-dimensional real-valued object descriptors into compact binary codes can address both memory usage and computational problems. the transformation and resulting compression of data enables storage of a large number of binary codes in memory. A small Hamming distance between codes for similar objects allows queries to be limited to a neighborhood around the binary code associated with the searched feature; thereby further reducing query time and processor usage. The objects with codes within a small Hamming distance of the code for the query can then be retrieved. The Hamming distance can be efficiently computed with hardware (i.e., CPUs, multi-core graphics processors), which can compute millions of distances per second.

For all cases, deep learning based methods LSTM+triplet, DSLHN(w/o CE) (CE=cross-entropy) and DSLHN consistently outperform shallow methods LSH and ITQ because deep leaning based approach can capture temporal dynamics within time series segments. Within deep learning based methods, our proposed DSLHN provides the best performance in almost all cases for both retrieval and classification tasks. We also find that the proposed DSLHN constantly outperforms DSLHN(w/o CE). It implies cross-entropy loss surely improves both retrieval and classification performance in our model.

Figure 5:
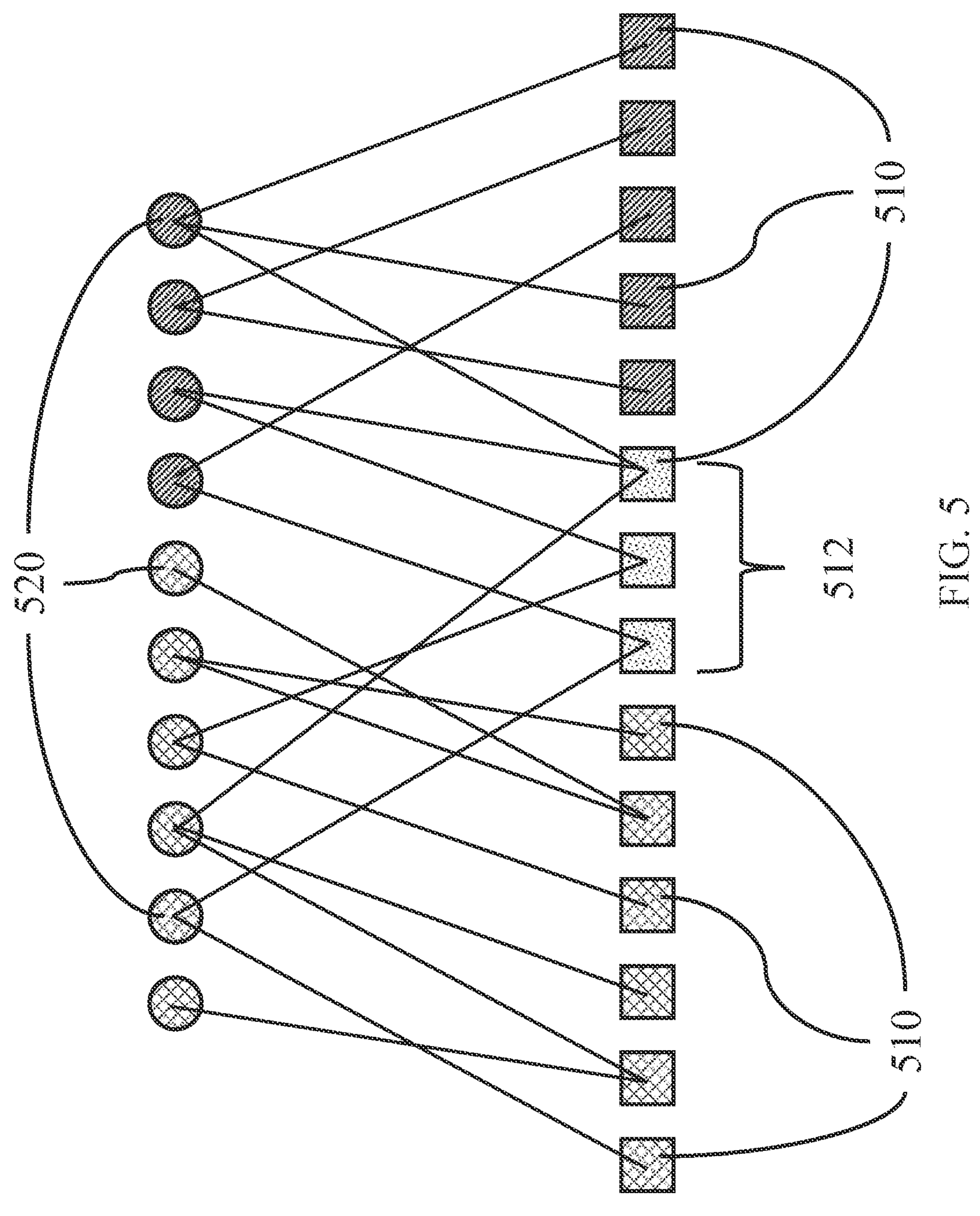
FIG. 5 is a diagram illustrating triplet loss with local boundaries, in accordance with an embodiment of the present invention.

FIG. 5 is a diagram illustrating triplet loss with local boundaries, in accordance with an embodiment of the present invention.

This may have a large influence if the decision boundaries in the Hamming space are obscure, since short binaries like sub-linear binary codes by $H_2(\cdot)$ have poor information to fully represent input time series segments. The sublinear hashcode pattern 510 does not uniquely map to the individual classes 520. A subset 512 of the hashcodes may map to two or more classes, due to local minima. Therefore, information from class labels can be fully utilized to differentiate feature representation around the boundaries if they are available. However, considering local boundaries may not be sufficient if there is only poor information like sub-linear binary codes.

Figure 6:
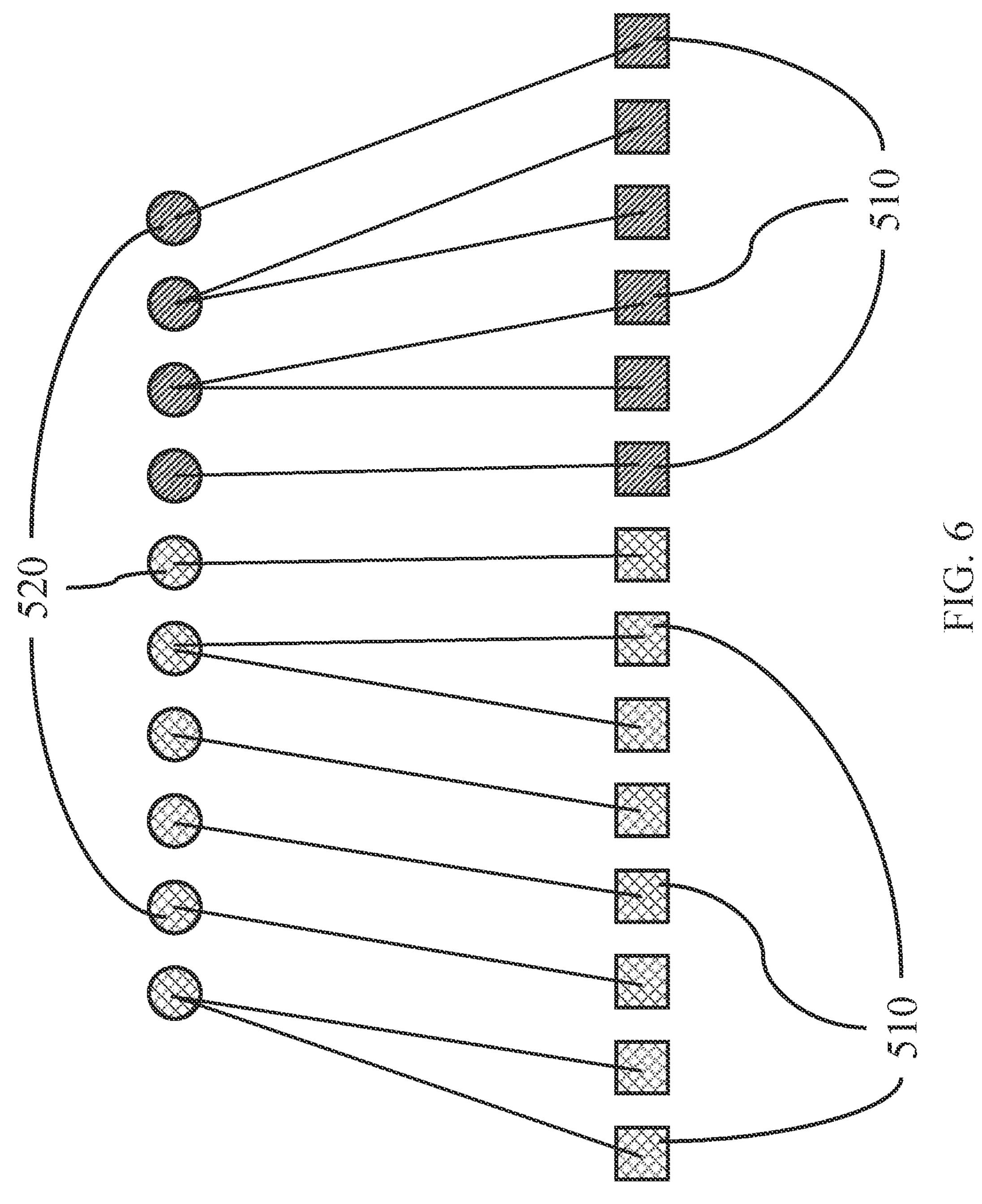
FIG. 6 is a diagram illustrating triplet loss and cross-entropy with global boundaries, in accordance with an embodiment of the present invention.

FIG. 6 is a diagram illustrating triplet loss and cross-entropy with global boundaries, in accordance with an embodiment of the present invention.

The addition of a cross-entropy loss can further differentiate features based on global minima, so each sublinear hash code maps to a single class 520. The subset 512 of sublinear hashcodes that mapped to two or more classes without the cross-entropy loss can thereby be eliminated even though two or more different hashcodes 510 may map to the same class 520.

Figure 7:
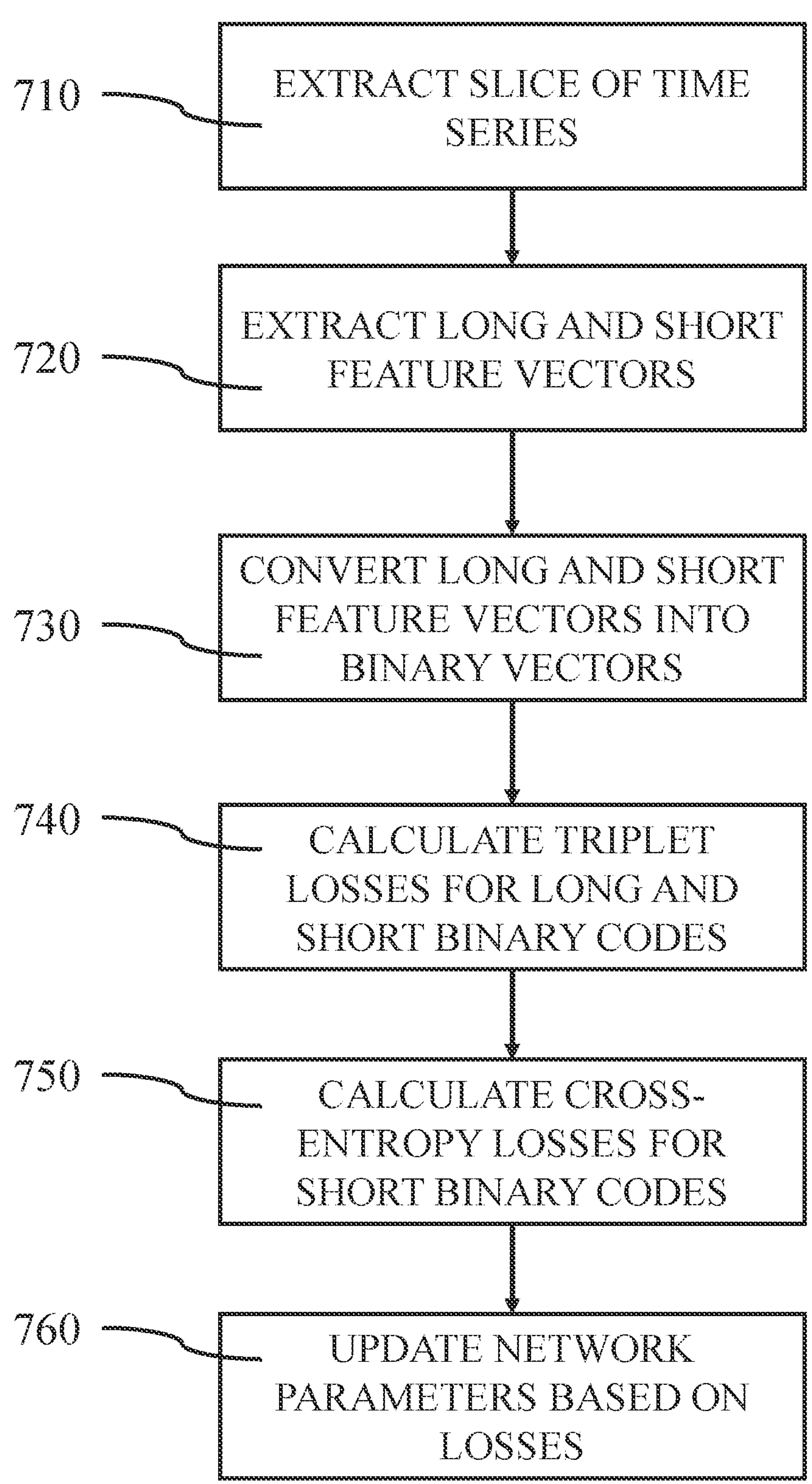
FIG. 7 is a block/flow diagram illustrating a method of training a neural network for hash code generation and retrieval, in accordance with an embodiment of the present invention.

FIG. 7 is a block/flow diagram illustrating a method of training a neural network for hash code generation and retrieval, in accordance with an embodiment of the present invention.

At block 710, a slice of the multivariate time series that lasts for a predetermined number of time steps is extracted from the entire multivariate time series 120 using a sliding window. The length of sliding window can depend on how the time series data is collected, for example, if the data is recorded every minutes for five consecutive days, a sliding window of length 60 can be used for summarizing observations in a 1 hour time window.

At block 720, long and short feature vectors are extracted utilizing a recurrent neural network.

At block 730, binary vectors are generated from the long and short feature vectors by checking the signs of all entries of features.

At block 740, triplet losses are calculated for both long and short binary codes.

At block 750, a cross-entropy loss is calculated for the short binary codes to differentiate feature representation between different classes.

At block 760, the parameters of the neural network(s) are updated based on the triplet losses and cross-entropy loss.

Figure 8:
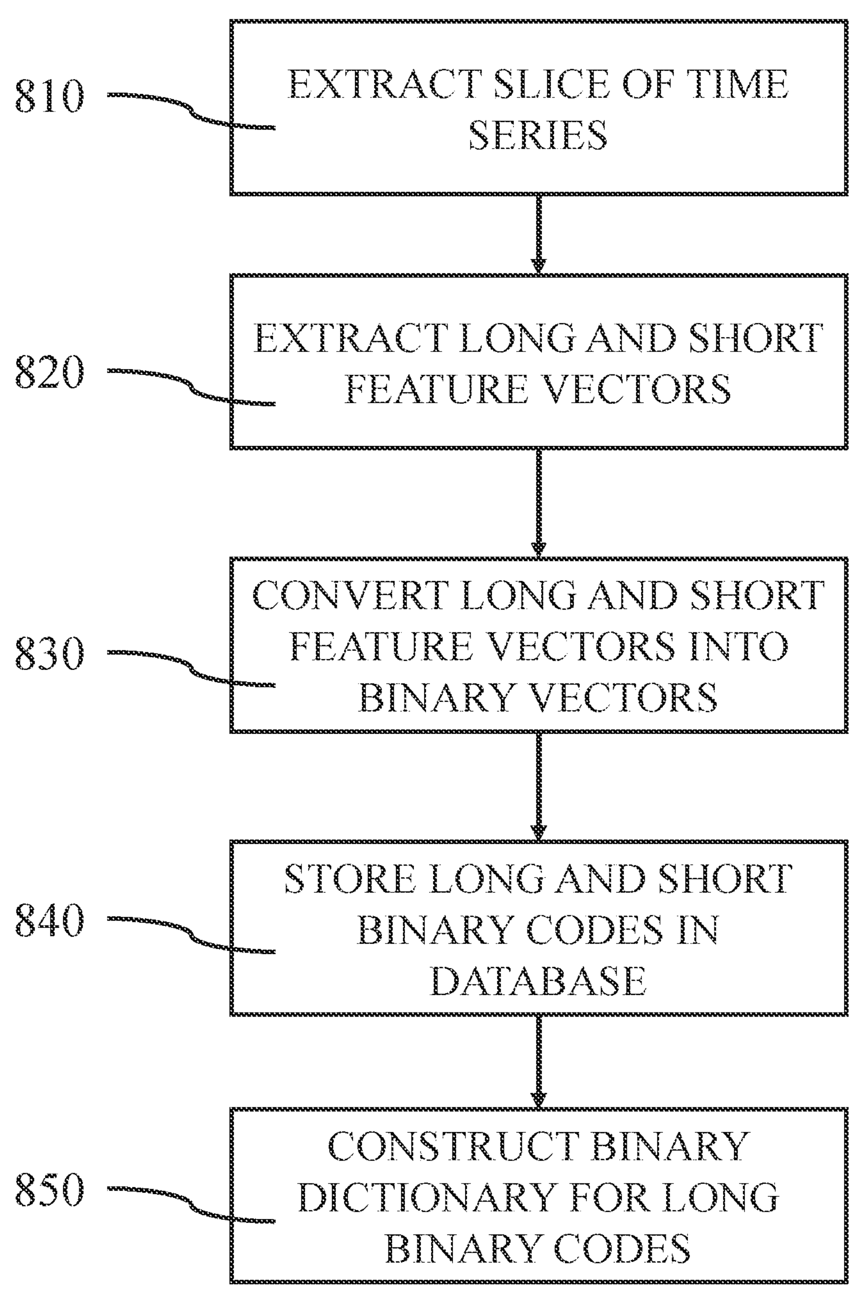
FIG. 8 is a block/flow diagram illustrating a method of implementing a neural network for hash code generation and retrieval, in accordance with an embodiment of the present invention.

FIG. 8 is a block/flow diagram illustrating a method of implementing a neural network for hash code generation and retrieval, in accordance with an embodiment of the present invention.

After training has been completed, a hashing process can be conducted.

At block 810, a slice of the multivariate time series that lasts for a predetermined number of time steps is extracted from the entire multivariate time series 120 using a sliding window. This can be a new, and yet unseen, time series segment that was not used for training or validation of the neural network(s).

At block 820, long and short feature vectors are extracted for the time series segments utilizing the trained recurrent neural network(s).

At block 830, binary vectors are generated from the long and short feature vectors generated by the trained neural networks by checking the signs of all entries of features.

At block 840, long and short binary codes are stored in a database.

At block 850, a binary dictionary that stores the set of long binary codes that have the same bit pattern as the short binary code(s) can be constructed.

Figure 9:
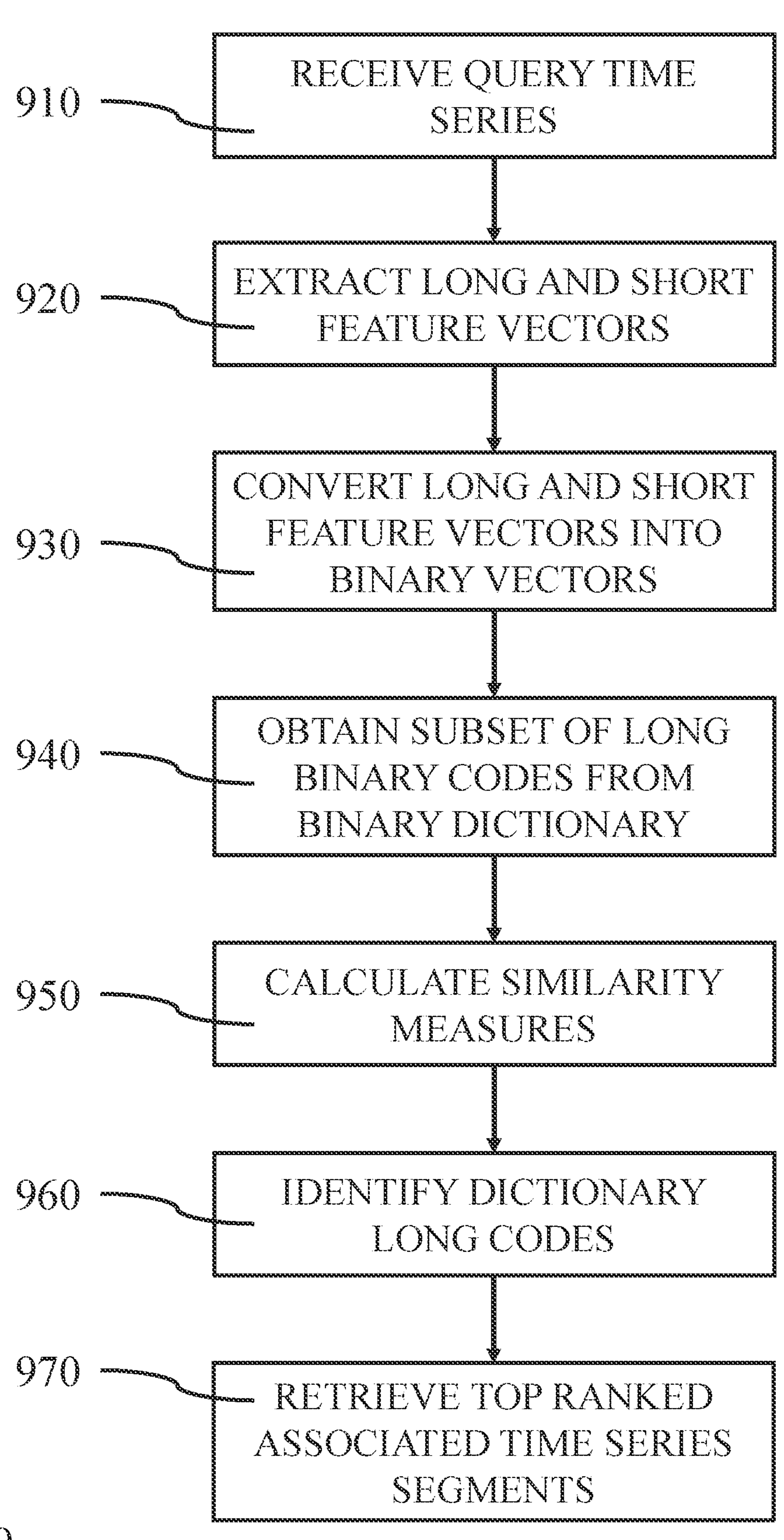
FIG. 9 is a block/flow diagram illustrating a method of implementing a neural network for time series retrieval, in accordance with an embodiment of the present invention.

FIG. 9 is a block/flow diagram illustrating a method of implementing a neural network for time series retrieval, in accordance with an embodiment of the present invention.

At block 910, the system can receive a time series segment for a query and retrieval of similar time series segments.

At block 920, for the current observed time series segment, long and short features are extracted based on the recurrent neural network learned during the training.

At block 930, long and short feature vectors of the query time series segment are converted to long and short binary codes, respectively, by checking signs of all entries in those feature vectors.

At block 940, the subset of long binary codes that have the same short binary code as extracted from the long and short feature vectors of the query time series segment are retrieved from the binary dictionary constructed in the hashing stage. A sufficient number of long binary codes should be obtained from the dictionary, where a sufficient number is a value larger than k to retrieve top-k similar samples from the database.

At block 950, a pairwise similarity can be calculated between a long binary code extracted from the query and all long binary codes retrieved from the dictionary.

At block 960, a predetermined number of dictionary long codes having the similarity measures indicting a closest relationship between the long binary codes and dictionary long codes are identified.

At block 970, based on the calculated similarities, retrieve a predetermined number of multivariate time series segment identified as the most relevant to the query. The retrieved number of multivariate time series segment can be used for generating an output including a visual representation of the relevant time series segment(s) on a user interface, for example, a display or mobile user device. The predetermined number of time series segments can be displayed to one or more users, where the displayed time series segment(s) can indicate a condition or status of the monitored system to the user. The predetermined number is how many samples we want to see from the most relevant.

Figure 10:
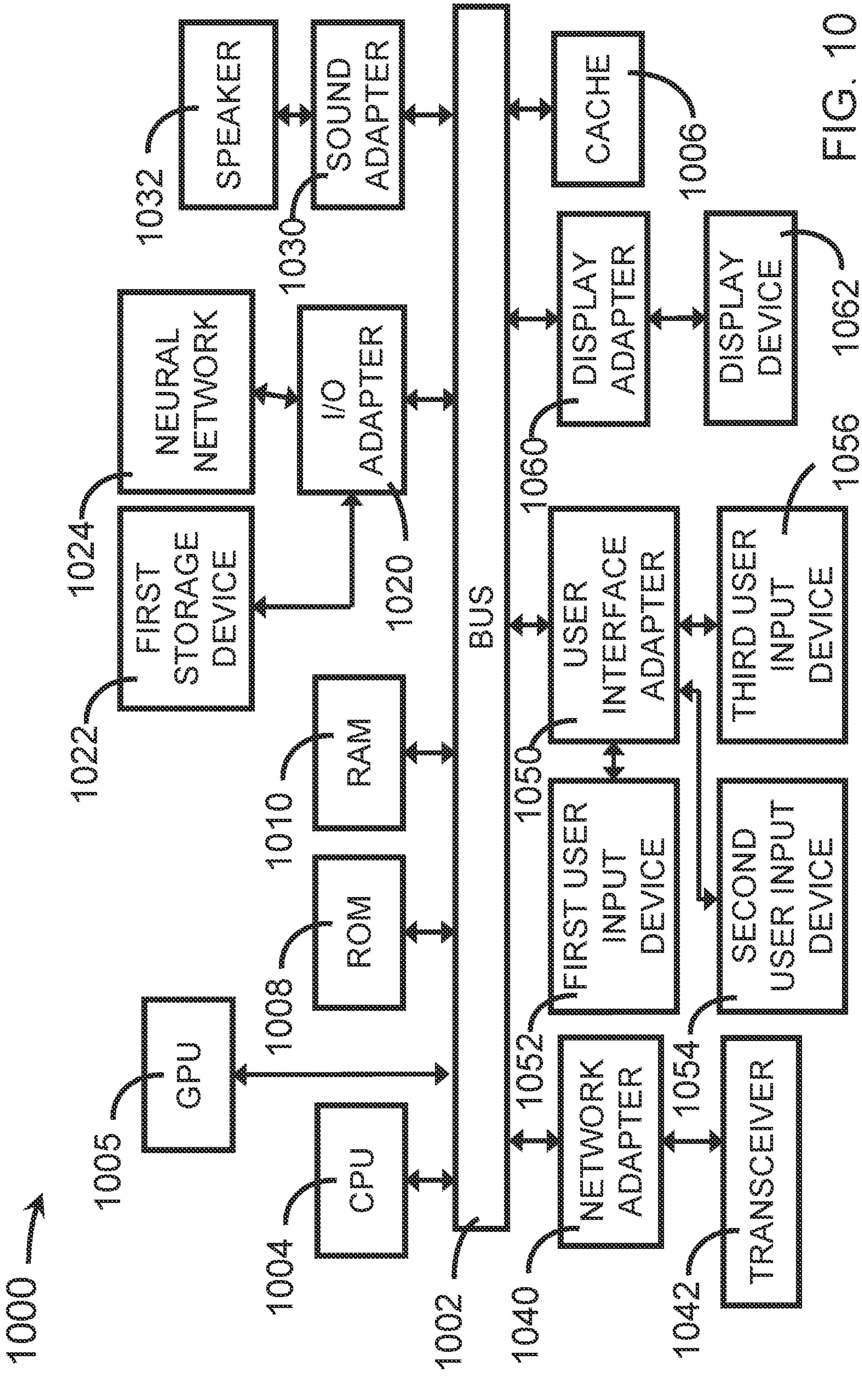
FIG. 10 is an exemplary processing system 1000 to which the present methods and systems may be applied, in accordance with an embodiment of the present invention.

FIG. 10 is an exemplary processing system 1000 to which the present methods and systems may be applied, in accordance with an embodiment of the present invention.

The processing system 1000 can include at least one processor (CPU) 1004 and may have a graphics processing (GPU) 1005 that can perform vector calculations/manipulations operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and/or a display adapter 1060, can also be operatively coupled to the system bus 1002.

A first storage device 1022 and a second storage device 1024 are operatively coupled to system bus 1002 by the I/O adapter 1020, where a neural network can be stored for implementing the features described herein. The storage devices 1022 and 1024 can be any of a disk storage device (e.g., a magnetic or optical disk storage device), a solid state storage device, a magnetic storage device, and so forth. The storage devices 1022 and 1024 can be the same type of storage device or different types of storage devices.

A speaker 1032 can be operatively coupled to the system bus 1002 by the sound adapter 1030. A transceiver 1042 can be operatively coupled to the system bus 1002 by the network adapter 1040. A display device 1062 can be operatively coupled to the system bus 1002 by display adapter 1060.

A first user input device 1052, a second user input device 1054, and a third user input device 1056 can be operatively coupled to the system bus 1002 by the user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 can be used to input and output information to and from the processing system 1000.

In various embodiments, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Moreover, it is to be appreciated that processing system 1000 is a system for implementing respective embodiments of the present methods/systems. Part or all of processing system 1000 may be implemented in one or more of the elements of FIGS. 1-8. Further, it is to be appreciated that processing system 1000 may perform at least part of the methods described herein including, for example, at least part of the method of FIGS. 1-8.

Figure 11:
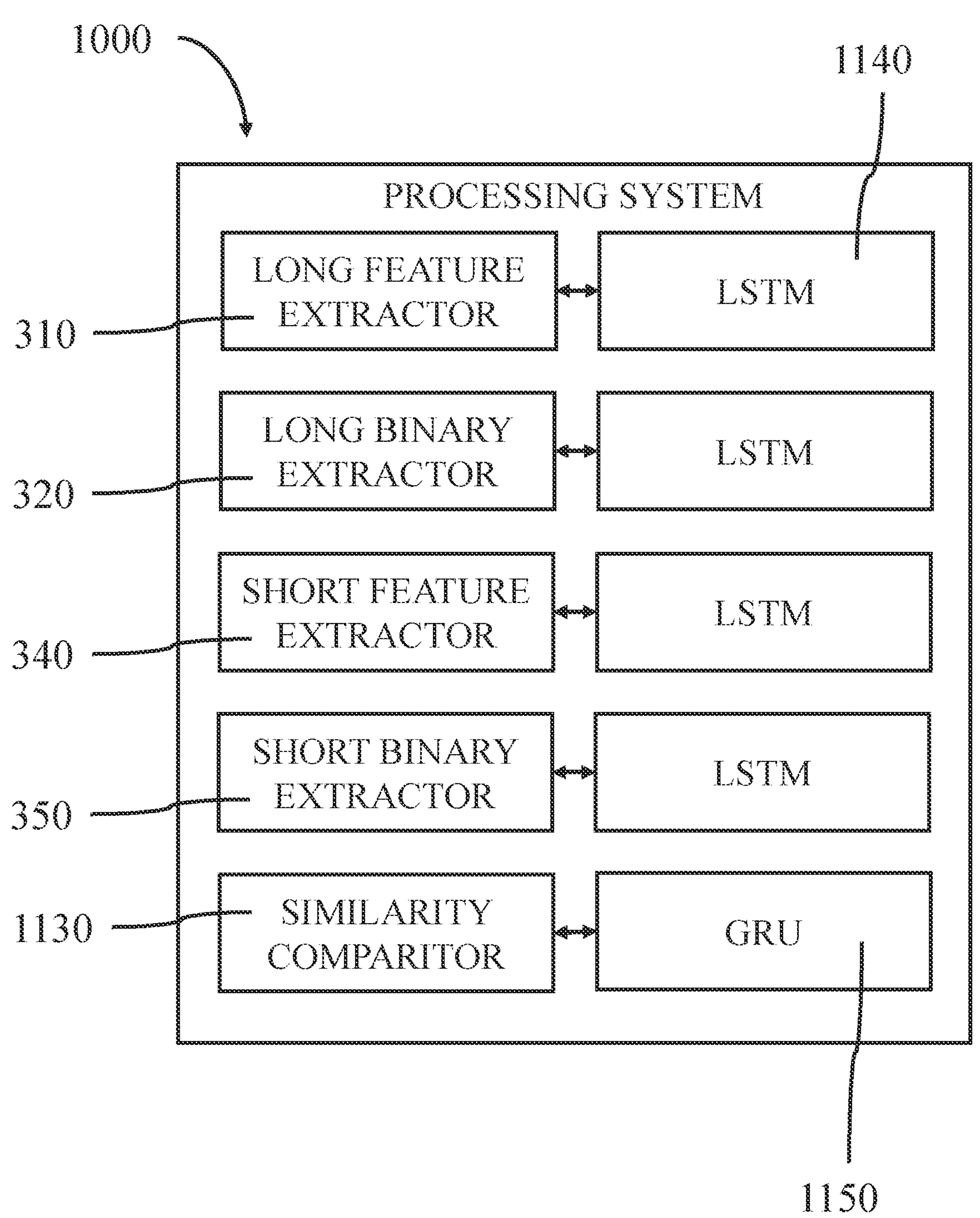
FIG. 11 is an exemplary processing system 1000 to which the present methods may be applied to and using LSTM and GRU neural networks and database(s), in accordance with an embodiment of the present invention.

FIG. 11 is an exemplary processing system 1000 to which the present methods may be applied to and using LSTM and GRU neural networks and database(s), in accordance with an embodiment of the present invention.

In various embodiments, the neural network (s) (e.g., LSTMs, GRUs, etc.) can be implemented on the processing system 1000, where the long short term memories 1140 of the feature extractors and GRUs of the similarity comparators 1130 may be stored in storage device 1024. The similarity comparator 1130 stored in memory can be configured to calculate a pairwise similarity measure between a long binary code extracted from the query and all long binary codes retrieved from a dictionary, and identifying a predetermined number of dictionary long codes having the similarity measures indicting a closest relationship between the long binary codes and dictionary long codes. The received and collected time series data 120 can be stored in a database that may reside in the first storage device 1022 and/or the second storage device 1024. The sensors 110 can be connected to and in electronic communication with system 1000 through network adapter 1040 and/or a communications port or other adapter.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It will be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method of retrieving similar multivariate time series segments, comprising:

converting long feature vectors and short feature vectors extracted from multivariate time series segments into long binary codes and short binary codes, respectively;

training a neural network that preserves similarity measure relations from the short binary codes and the long binary codes with triplet losses and cross-entropy loss to utilize label information for capturing a global decision boundary in a feature space from the multivariate time series segments including:

computing a first Hamming distance between an output value of a hash function for an anchor class label and an output value of the hash function for a positive class label;

computing a second Hamming distance between the output value of the hash function for the anchor class label and an output value of the hash function for a negative class label;

computing the triplet losses based on a maximum between zero and a sum of a margin value and a difference of the first Hamming distance and the second Hamming distance;

computing the cross-entropy loss based on a product of a one-hot representation of a class label and a logarithm of a predicted probability for a segment from the multivariate time series segments, and a one vector with a class label set length;

obtaining, with the neural network, a subset of long binary codes from a binary dictionary storing dictionary long codes based on the short binary codes;

calculating similarity measures for each pair of the long feature vectors with each dictionary long codes;

identifying, with the neural network, a predetermined number of dictionary long codes having the similarity measures indicating a closest relationship between the long binary codes and the dictionary long codes; and reducing memory complexity and usage by compressing corresponding data for the multivariate time series segments for downstream tasks by retrieving a predetermined number of time series segments associated with the predetermined number of dictionary long codes.

2. The computer-implemented method as recited in claim 1, wherein training the neural network further comprises minimizing a sum of the triplet losses relaxed to be continuous and differentiable, and the cross-entropy loss.

3. The computer-implemented method as recited in claim 1, wherein the long feature vectors and the short feature vectors are extracted from the multivariate time series segments using a long short term memory (LSTM).

4. The computer-implemented method as recited in claim 3, wherein the long feature vectors are converted into the long binary codes by checking signs of all entries in the long feature vectors.

5. The computer-implemented method as recited in claim 4, wherein the short feature vectors are converted into the short binary codes by classifying the short binary codes to classes with a linear mapping.

6. The computer-implemented method as recited in claim 2, wherein training the neural network further comprises compressing intermediate features from the class labels to desired dimensional features with a classification layer.

7. The computer-implemented method as recited in claim 5, wherein classifying involves computing, with a softmax layer, a probability of the short binary codes belonging to each of a plurality of labels associated with the multivariate time series segments.

8. A processing system for retrieving similar multivariate time series segments, comprising:

one or more processors;

a memory coupled to the one or more processors;

a long feature extractor stored in the memory, wherein the long feature extractor is configured to extract long feature vectors from multivariate time series segments;

a short feature extractor stored in the memory, wherein the short feature extractor is configured to convert the long feature vectors generated by the long feature extractor into shorter length features through a linear mapping;

a long binary extractor stored in the memory, wherein the long binary extractor is configured to convert the long feature vectors from the long feature extractor into long binary codes having a same length as the long feature vectors;

a short binary extractor stored in the memory, wherein the short binary extractor is configured to convert short feature vectors from the short feature extractor into short binary codes having the same length as the short feature vectors;

a neural network trained to preserve similarity measure relations from the short binary codes and the long binary codes with triplet losses based on a maximum between zero and a sum of a margin value and a difference of a first Hamming distance between an output value of a hash function for an anchor class label and an output value of the hash function for a positive class label and a second Hamming distance between the output value of the hash function for the anchor class label and an output value of the hash function for a negative class label and cross-entropy loss based on a product of a one-hot representation of a class label and a logarithm of a predicted probability for a segment from the multivariate time series segments, and a one vector with a class label set length, to utilize label information for capturing a global decision boundary in a feature space from the multivariate time series segments; and a similarity comparator stored in the memory, wherein the similarity comparator is configured to calculate a pair-wise similarity measures between the long binary codes extracted from query and the long binary codes retrieved from a dictionary, and reduces memory complexity and usage by compressing corresponding data for the multivariate time series segments for down-stream tasks by identifying a predetermined number of dictionary long codes having the pairwise similarity measures indicating a closest relationship between the long binary codes and dictionary long codes.

9. The processing system as recited in claim 8, wherein the short feature vectors from the short feature extractor are converted into the short binary codes having the same length as the short feature vectors by checking signs of entries in the short feature vectors.

10. The processing system as recited in claim 8, wherein the similarity comparator is configured to retrieve a predetermined number of time series segments associated with the predetermined number of dictionary long codes, and display the predetermined number of time series segments to a user.

11. The processing system as recited as recited in claim 10, wherein the long feature vectors and the short feature vectors are extracted from the multivariate time series segments using a long short term memory (LSTM).

12. The processing system as recited as recited in claim 11, wherein the long feature vectors are converted into the long binary codes by checking signs of all entries in the long feature vectors.

13. The processing system as recited as recited in claim 12, wherein the short feature vectors are converted into the short binary codes by a linear mapping.

14. The processing system as recited as recited in claim 13, wherein the short binary extractor is further configured to classifying the short binary codes to classes.

15. A computer program product for retrieving similar multivariate time series segments, the computer program product comprising a non-transitory computer readable storage medium having program instructions embodied there-with, the program instructions executable by a computer to cause the computer to perform a method comprising:

converting long feature vectors and short feature vectors extracted from multivariate time series segments into long binary codes and short binary codes, respectively;

training a neural network that preserves similarity measure relations from the short binary codes and the long binary codes with triplet losses and cross-entropy loss to utilize label information for capturing a global decision boundary in a feature space from the multivariate time series segments including:

computing a first Hamming distance between an output value of a hash function for an anchor class label and an output value of the hash function for a positive class label;

computing a second Hamming distance between the output value of the hash function for the anchor class label and an output value of the hash function for a negative class label;

computing the triplet losses based on a maximum between zero and a sum of a margin value and a difference of the first Hamming distance and the second Hamming distance;

computing the cross-entropy loss based on a product of a one-hot representation of a class label and a logarithm of a predicted probability for a segment from the multivariate time series segments, and a one vector with a class label set length;

obtaining, with the neural network, a subset of long binary codes from a binary dictionary storing dictionary long codes based on the short binary codes;

calculating similarity measures for each pair of the long feature vectors with each dictionary long codes;

identifying, with the neural network, a predetermined number of dictionary long codes having the similarity measures indicating a closest relationship between the long binary codes and the dictionary long codes; and reducing memory complexity and usage by compressing corresponding data for the multivariate time series segments for downstream tasks by retrieving a predetermined number of time series segments associated with the predetermined number of dictionary long codes.

16. The computer program product as recited in claim 15, wherein to train the neural network further comprises updating parameters of the neural network through backpropagation based on an optimization objective function that utilizes criterions for codes obtained at a top layer of the neural network.

17. The computer program product as recited in claim 15, wherein the long feature vectors and the short feature vectors are extracted from the multivariate time series segments using a long short term memory (LSTM).

18. The computer program product as recited in claim 17, wherein the long feature vectors are converted into the long binary codes by checking signs of all entries in the long feature vectors.

19. The computer program product as recited in claim 18, wherein the short feature vectors are converted into the short binary codes by a linear mapping.

20. The computer program product as recited in claim 19, further comprising classifying the short binary codes to a class, wherein classifying involves computing a probability of the short binary codes belonging to each of a plurality of labels associated with the multivariate time series segments.

* * * * *